Figure 1:
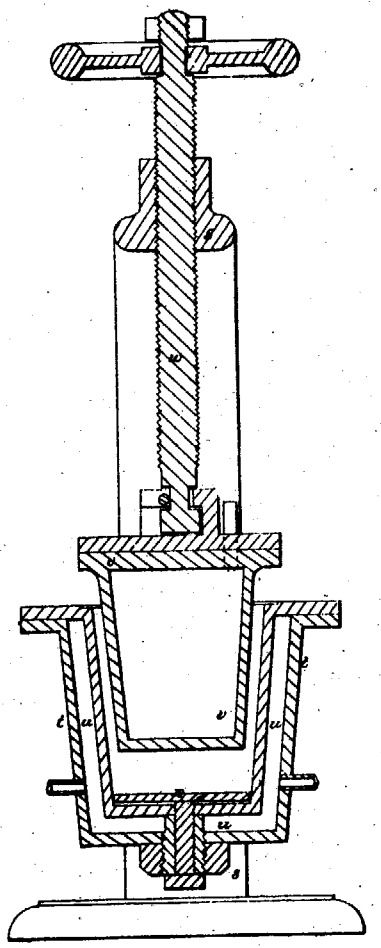

D. Hayward. Sheet 1. 2 Sheets.
Vulcanizing Apparatus.
No. 3,531. Reissued Jul. 6, 1869.
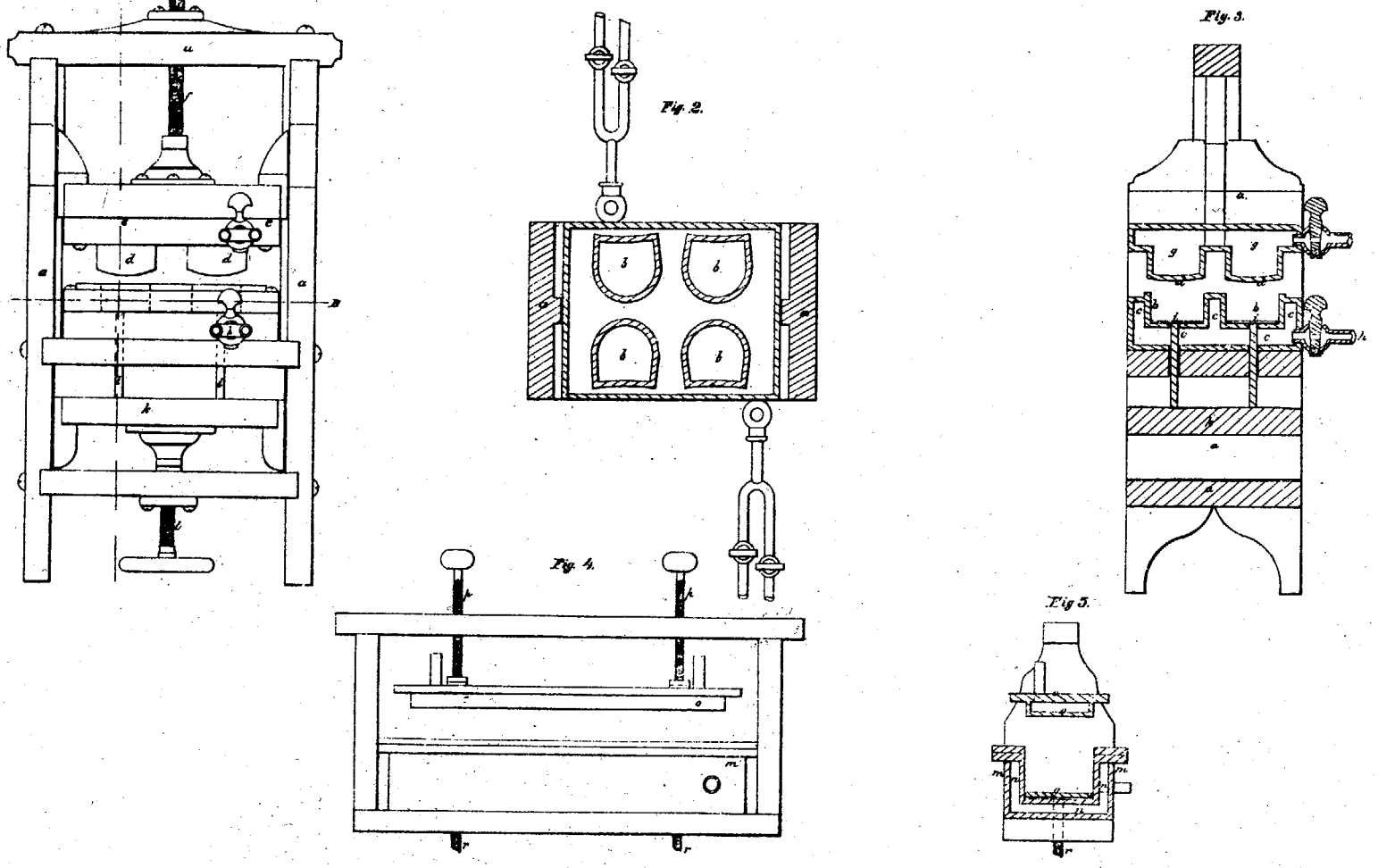

D. Hayward. Sheet 1, 2 Sheets.

Vulcanizing Apparatus.

No. 3,531 Reissued Jul 6. 1869.

UNITED STATES PATENT OFFICE.

JAMES S. CAREW, OF NORWICH, CONNECTICUT, ASSIGNEE OF CALEB SWAN, (EXECUTOR OF DANIEL HAYWARD, DECEASED.)

IMPROVEMENT IN THE MANUFACTURE OF INDIA-RUBBER.

Specification forming part of Letters Patent No. 11,608, dated August 29, 1854; extended seven years; reissue No. 3,531, dated July 6, 1869.

*To all whom it may concern:*

Be it known that I, JAMES S. CAREW, of Norwich, in the county of New London and State of Connecticut, am the owner of certain Letters Patent for an Improvement in the Manufacture of India-Rubber, granted to DANIEL HAYWARD, of Providence, in the State of Rhode Island, August 29, 1854, and extended August 28, 1868; that I deem said patent inoperative and invalid by reason of a defective specification; and that the following description, taken in connection with the accompanying drawings hereinafter referred to, forms a full and exact specification of the same, wherein are set forth the nature and principle of said improvements, by which said invention may be distinguished from others of a similar class, together with such parts as are claimed, and desired to be secured by Letters Patent.

Prior to the invention of said HAYWARD the value of vulcanized rubber ceased when the various articles to the construction of which it had been applied had become worn out, or served the purposes for which they were prepared, as it is well known, and necessarily follows from the process by which rubber is cured, that it possesses properties which practically prevent its being worked over or used a second time.

The improvement of said HAYWARD consists in a new process for vulcanizing and molding any compound of india-rubber which is capable of being vulcanized, and is applicable also to working over and revulcanizing rubber compound which has already been vulcanized and put to use; and by the said process, also, many foreign substances may be intermixed with the ordinary rubber compound, whether already once vulcanized, or newly compounded for vulcanization, so as to form a substance having the valuable properties of vulcanized rubber compound, although composed in great part of cheaper materials.

The principal features of said process consist in applying heat by means of steam to rubber mixed with the substances commonly used in vulcanizing rubber, or to rubber compound which has once been vulcanized, either with or without the addition of fresh rubber; the rubber or compound while thus heated being pressed into molds or dies of the desired form, and the steam being introduced into steam-chambers or steam-jackets, and thereby conducted around the molds or dies which come in contact with the compound to be acted upon. By this means the process of curing rubber is greatly facilitated, and vulcanized rubber readily pressed and revulcanized into any desired shape. By thus treating rubber compounded with the substances commonly used, many foreign articles also—such as scraps of cloth, old vulcanized rubber, coal or wood tar, or any adhesive substance—may be so combined with it as to produce a substance which has all the valuable properties of vulcanized rubber, although the greater bulk of it is composed of other and cheaper materials. The induration of the rubber or substance thus formed may also be regulated at pleasure, if desirable, by increasing or diminishing the amount of the steam in the steam chambers or jackets, or by admitting cold water into them around the molds or dies in its stead, thereby checking the curing of the rubber at any desired stage of the process.

Figure 6:
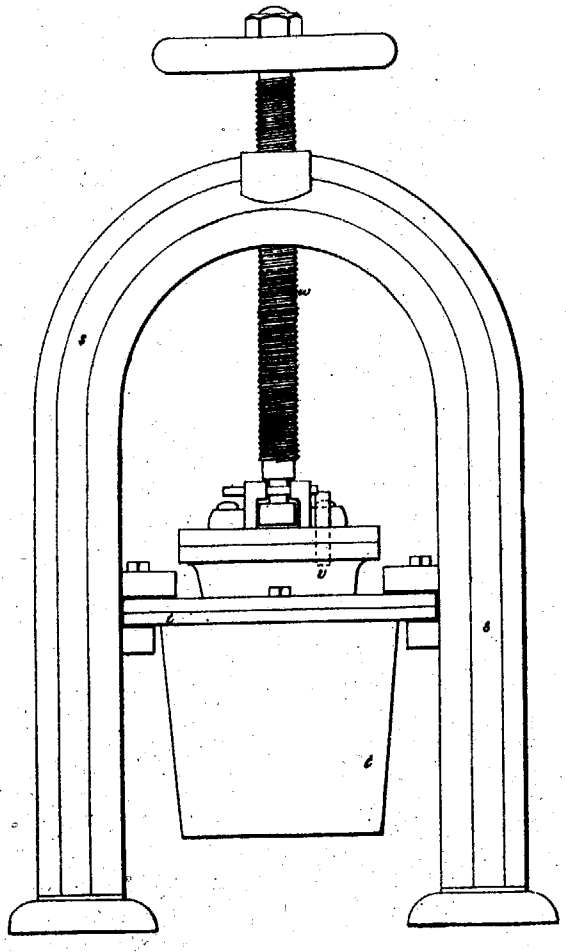

In order to illustrate the application of this process to the manufacture of different articles, the method of making boot and shoe heels, planks, and buckets, and the substances of which they are composed, may be described by reference to the accompanying drawings, as follows:

Figure 1, Plate 1, is an elevation of the apparatus for making boot-heels. Fig. 2 is a horizontal section of the same, taken in the plane of the line A B, Fig. 1. Fig. 3 is a transverse vertical section of the same, taken on the plane of the line C D, Fig. 1. Fig. 4 is a side elevation of the apparatus for making planks; and Fig. 5 is a central transverse section of the same. In Plate 2, Fig. 6 is a front elevation of the apparatus for making buckets, and Fig. 7 is a vertical section of the same.

I shall first describe the apparatus for making boot and shoe heels.

*a a a*, in Figs. 1, 2, and 3, Plate 1, represent the frame-work of the apparatus. *b b*, &c., are the molds in which the heels are shaped and cured, and have formed all around their bottoms and sides a hollow space or chamber, *c c*. The dies *d d*, &c., are attached to a sliding frame, *e e*, which is moved up and down by a screw, *f*, as will be readily understood by inspection of Fig. 1, Plate 1. These dies are hollow, and communicate with and form a part of a chamber, *g g*, Fig. 3, Plate 1.

The different substances of which the heels are to be composed, such as old pieces of vulcanized rubber, scraps of cloth, sulphur, white lead, coal-tar, &c., are first mashed, ground, or kneaded together by being passed through grinding and calendering rolls, or by any of the methods commonly practiced.

Steam is admitted through the pipe *h* into the chambers *c c c*, and circulates through the same and entirely around the sides and bottoms of the molds, which are thus heated by the steam. Every part of the rubber or substance which comes in contact with the molds will be thus heated by the steam, the heat of which will soften the compound which is placed in the molds. By then depressing the dies *d d*, into the chambers *g g* of which steam has been admitted, the proper shape will be given to the heel. After the heels have been exposed to the heat of the steam long enough to become sufficiently hardened, they are pressed out of the molds by the followers *i i i i*, which are pushed up by the sliding bar *k k*, actuated by the screw *z*.

In order to check the curing or induration of the top of the heel so that it may adhere to the boot or shoe, the steam may be permitted to escape from the chamber *g g* about the dies before the heels are taken out from the molds, or cold water admitted in its stead, which checks the induration of the top of the heel, and produces the desired effect. In the same manner cold water may be admitted into the chamber *c c* about the mold, or the steam may be shut off, and the amount to which the heels shall be cured regulated at pleasure.

The apparatus for making planks, represented in Figs. 4 and 5 of Plate 1, consists in a mold, *m m*, surrounded by a chamber, *n n*, and a hollow movable die or pressure platform, *o o*, actuated by screws *p p*. The rubber and other substances to be cured and shaped, after being properly prepared, are placed in the mold *m m*. Steam having been introduced into the hollow die and into the chamber *n n*, about the mold *m m*, the die is pressed upon the compound, and the planks are then cured by the action of the steam, and shaped by pressure, as in the first-described method of making heels. The planks, when finished, are pressed out of the molds by means of a follower, *q*, actuated by screws *r r*.

In Plate 2, Figs. 6 and 7, the apparatus for making buckets is represented. It consists of a frame-work, *s s*, supporting a mold, *t t*, of proper shape for forming the bucket. This mold is formed of an inner and outer casting, leaving a space, *u u*, all around the sides and bottom of the mold. *v v* is a hollow die, corresponding in shape to the shape of the mold *t t*, but of smaller diameter, and actuated so as to be moved up and down by a screw, *w*.

The rubber and other substances hereinbefore mentioned, of which the buckets are to be composed, are combined together, as before, in any desired proportions, and placed in the mold *t t*, when the die *v v* is depressed, and presses against the substance between it and the mold, giving the desired shape to the compound, so that the surfaces of the compound in the mold will come in contact with a surface heated by steam, whereby it will be softened, so as to be readily shaped, and afterward completely cured, forming an indurated substance, having all the valuable properties of vulcanized rubber. The bucket when finished is pushed out of the mold by a movable follower, *x*, on the bottom of the same.

The three varieties of apparatus hereinbefore described sufficiently illustrate the application of the said HAYWARD'S improved process to the production of different articles manufactured of rubber or its compounds, and it will be seen that an essential feature of said process consists in so introducing steam to the molds and dies as to cause it to circulate entirely through and around the same, or substantially so, so that substantially every part of the rubber or compound which bears against the molds or dies shall come in contact with a surface heated by steam. Steam thus circulating within the chambers of the molds and dies produces a heat which causes the softening of the compounds of which the article is to be manufactured, to which the requisite shape or form is readily imparted by the pressure of the dies. The rubber and its compounds, commonly used together with the other foreign substances hereinbefore mentioned, become so cured by the application of steam and pressure as to produce a substance which has all the valuable properties of vulcanized rubber, and, furthermore, the great bulk of the substance may be composed of cheap materials with only a small portion of rubber, thereby producing vulcanized rubber, or a substance which has all the valuable properties of the same, at a very small cost. By this process, also, vulcanized rubber can be worked over a second time either with or without the addition of fresh rubber, thereby enabling worn out articles made of vulcanized rubber to be used which have heretofore been destroyed as worthless. The introduction of water is also, in some cases, a valuable feature of this process, as by it the extent to which the rubber shall be cured or indurated can be regulated at pleasure. In some cases, and for the manufacture of certain articles, especially where pressure is not necessary for the purpose of filling the mold with the substance to be vulcanized, the mere confinement of the compound between the surrounding steam jackets or chambers may be sufficient without the application of any actual pressure before vulcanizing, inasmuch as the material always expands in bulk during the process of vulcanization, and thereby in itself produces a pressure upon the surface by which it is surrounded and confined. But in other cases pressure is necessarily applied; first, in order to force the material to be vulcanized and molded into all parts of the mold; second, in order to give homogeneousness to the material and to free it from blisters and other imperfections; and this is especially the case where foreign substances are introduced into the compound to be vulcanized. And where rubber goods vulcanized by the ordinary process in ovens or steam-boilers are blistered or imperfectly vulcanized, it is found that by placing them between steam-jackets and under pressure the defects are cured and the blisters and imperfections are removed by the action of the heat and pressure thus applied.

It is also obvious that, although for the complete working of said HAYWARD'S process the surface of the material or article to be vulcanized should be substantially in all its parts subjected to the action of the heat by contact with the walls of the surrounding steam jackets or chambers, yet it is not in all cases absolutely essential that it should be entirely surrounded on all sides by such chambers; as, for example, that the edges of a large sheet of rubber, or of any article having a large surface, might be exposed or confined by a mere rim or wall of metal or other substance without materially affecting the operation of vulcanization, provided the other and larger surfaces were properly subjected to the heat and pressure.

It will be evident that the consistency of the articles manufactured by this process can be varied by mixing the rubber and other substances in varying proportions.

By a review of the foregoing description it will be seen that one of the most important advantages gained by this process is the curing again and reproducing of vulcanized rubber from scraps or fragments which have once been vulcanized. Heretofore these substances have been wholly valueless, and have been thrown away as rubbish; and this invention, in fact, enables a new manufacture to be produced. Another feature, which is considered important, is, that, whether this process is applied to rubber which has been once vulcanized or to rubber which has not, the articles can be cured in a very few moments, and thus save the immense waste of fuel and loss of time which the ordinary process requires. The ordinary process of vulcanizing goods is by inserting them in very large ovens, or in large steam-vessels, where they are kept at a graduated temperature from six to ten hours.

The proportions and compounds which said Hayward used are described as follows: When preparing rubber which has once been vulcanized and then rejected as valueless, one pound vulcanized rubber one ounce coal-tar, one ounce to two ounces of sulphur; when preparing rubber in its natural state, one pound india-rubber, three-fourths ounce sulphur, one-half ounce litharge, one-half pound whiting or plaster of Paris; when preparing vulcanized rubber with foreign substances, eight pounds of the last compound, twenty pounds of rags, &c., two pounds of sulphur, one pint coal-tar, two pints of hard coal-tar or asphaltum. It is very evident that any person skilled in the manufacture can vary these proportions to an almost infinite degree, according to the article to be produced; and the machinery for giving the forms to the articles, and for conducting and regulating the heat to the fabric, is capable of an almost infinite variety. I do not, therefore, claim any peculiar compound or any particular arrangement of machinery, as this part of the invention of said DANIEL HAYWARD does not consist in a new composition of matter or in a new machine, but is applicable to all vulcanizable compounds, by means of suitable apparatus.

The first part of this invention relates to molding the compound used, and consists in the use of a mold which is heated by steam, as described, before the compound is placed in it, or before the pressure is applied for molding it, the other portion of the mold or the die—also heated by steam, as described—being brought into its place with force sufficient to cause the compound, which is softened by the heat, to completely fill the mold. This part of the invention is beneficial in some degree, even when the pure compound is used, but especially so when a compound is used which contains a portion of old vulcanized rubber.

The second part of this invention relates to the application of the heat necessary for curing the compound, and consists in applying it by means of steam in steam-chambers, or steam-jackets, as they are commonly called, the heat of the steam being conducted to the compound by those walls of the steam-chamber or steam-jacket which come in contact with it.

The third part of this invention consists in applying the necessary heat to the compound while under pressure, besides that pressure which would necessarily result from the expansion of the compound when confined in the mold. This pressure is believed to be especially beneficial when material is used consisting only in part of pure compound, but is regarded as of benefit in any compound, as it prevents imperfections of surface and want of homogeneousness in the goods, arising from air, water, or other foreign substance in the compound.

What I claim as the invention of said HAYWARD, and desire to secure by Letters Patent, is—

1. The herein-described process of vulcanizing and molding rubber compounds, viz., by means of molds heated substantially as described, and so arranged that the compound, being placed in the mold and therein softened by the heat, is then forced by pressure to fill the mold and therein vulcanized, substantially as described.

2. The herein-described process of vulcanizing rubber compounds, viz., by applying heat to the compound to be vulcanized by means of steam in steam-jackets, substantially as described.

3. The herein-described process of vulcanization of rubber goods, consisting in the application of heat, by means of steam-jackets, to the compound to be vulcanized while under pressure, substantially in the manner described.

JAMES S. CAREW.

Witnesses:
J. E. MAYNADIER,
CHAS. F. SLEEPER.